US010652896B2

(12) United States Patent
Belagal Math et al.

(10) Patent No.: US 10,652,896 B2
(45) Date of Patent: May 12, 2020

(54) INTELLIGENT TRANSPORTATION SYSTEM STATION, HOST PROCESSOR, VEHICLE AND METHOD THEREFOR

(71) Applicant: NXP B.V., Eindhoven (NL)

(72) Inventors: Chetan Belagal Math, Eindhoven (NL); Hong Li, Veldhoven (NL); Sonia Marcela Heemstra de Groot, Hengelo (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/119,152

(22) Filed: Aug. 31, 2018

(65) Prior Publication Data

US 2019/0159211 A1    May 23, 2019

(30) Foreign Application Priority Data

Nov. 23, 2017 (EP) .................................. 17203396

(51) Int. Cl.
    *H04W 72/04* (2009.01)
    *H04W 4/46* (2018.01)
    (Continued)

(52) U.S. Cl.
    CPC ......... *H04W 72/0486* (2013.01); *H04L 47/25* (2013.01); *H04L 47/38* (2013.01);
    (Continued)

(58) Field of Classification Search
    CPC ................................................. H04W 72/0486
    See application file for complete search history.

(56) References Cited

U.S. PATENT DOCUMENTS

2005/0100031 A1*   5/2005  Choe ...................... H04L 12/42
                                                             370/404
2009/0185489 A1    7/2009  Ruffini et al.
(Continued)

FOREIGN PATENT DOCUMENTS

WO    2016079320 A1    5/2016
WO    2017052690 A1    3/2017

OTHER PUBLICATIONS

"Annual Accident Report 2015", European Commission; www.erso.eu, downloaded Aug. 7, 2018.
"Intelligent Transport Systems (ITS); Vehicular Communications; Basic Set of Applications; Definitions", Technical Report ETSI TR 102 638 V1.1.1, Jun. 2009.
(Continued)

*Primary Examiner* — Kevin M Cunningham

(57) ABSTRACT

An intelligent transportation system (ITS) station (400) for a vehicle (200) is described. The ITS station (400) includes a packet count and vehicle count estimator (342) arranged to receive broadcast ITS transmissions from a plurality of neighbouring vehicles and provide an indication of a number of the plurality of vehicles and a number of packets received from the plurality of neighbouring vehicles; and a fair resource allocator circuit (410) operably coupled to the packet count and vehicle count estimator (342) and configured to adjust a broadcast message rate and a modulation data rate of an ITS transmission in a cooperative manner based on application reliability requirements, the number of the plurality of vehicles and the indication of the number of received packets; and a transmitter operably coupled to the fair resource allocator circuit (410) and configured to broadcast at least one ITS message using the adjusted broadcast message rate and adjusted modulation data rate. In this manner, an ITS station is provided that may improve and support application reliability requirements, such as safety applications.

20 Claims, 3 Drawing Sheets

(51) Int. Cl.
*H04W 28/02* (2009.01)
*H04L 12/825* (2013.01)
*H04L 12/811* (2013.01)

(52) U.S. Cl.
CPC ......... *H04W 4/46* (2018.02); *H04W 28/0231* (2013.01); *H04W 28/0284* (2013.01); *H04W 28/0289* (2013.01)

(56) References Cited

U.S. PATENT DOCUMENTS

| | | | |
|---|---|---|---|
| 2010/0267344 A1 | 10/2010 | Guner et al. | |
| 2011/0006913 A1* | 1/2011 | Chen | G08G 1/161 340/902 |
| 2018/0022350 A1* | 1/2018 | McNew | B60W 30/162 701/23 |
| 2018/0213376 A1* | 7/2018 | Pinheiro | H04W 76/14 |

OTHER PUBLICATIONS

"FMVSS No. 150 Vehicle-to-Vehicle Communication Technology for Light Vehicles", NHTSA, Office of Regulatory Analysis and Evaluation, National Center for Statistics and Analysis, Nov. 2016.
"On-Board System Requirements for V2V Safety Communications", SAE International, Surface Vehicle Standard, Mar. 2016.
Belagal Math, C., "Data Rate Based Congestion Control in V2V Communication for Traffic Safety Applications", IEEE 2015.
Belagal Math, C., "Fair Decentralized Data-Rate Congestion Control for V2V Communications", IEEE 2017.
Belagal Math, C., "V2X Application-Reliability Analysis of Data-Rate arid Message-Rate Congestion Control Algorithms", IEEE Communications Letters, 2017.
Kenney, J., "LIMERIC: A Linear Message Rate Control Algorithm for Vehicular DSRC Systems", VANET'11, Sep. 23, 2011.
Minelli, M., "The Potential of Transmit Data Rate Control for Channel Congestion Mitigation in VANET", IEEE 2016.

* cited by examiner

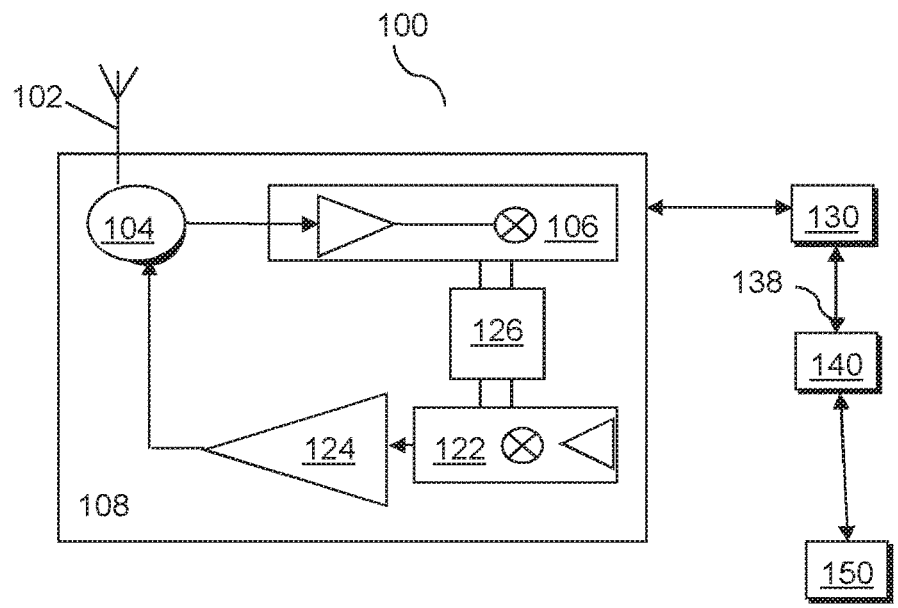
FIG. 1 – Prior Art
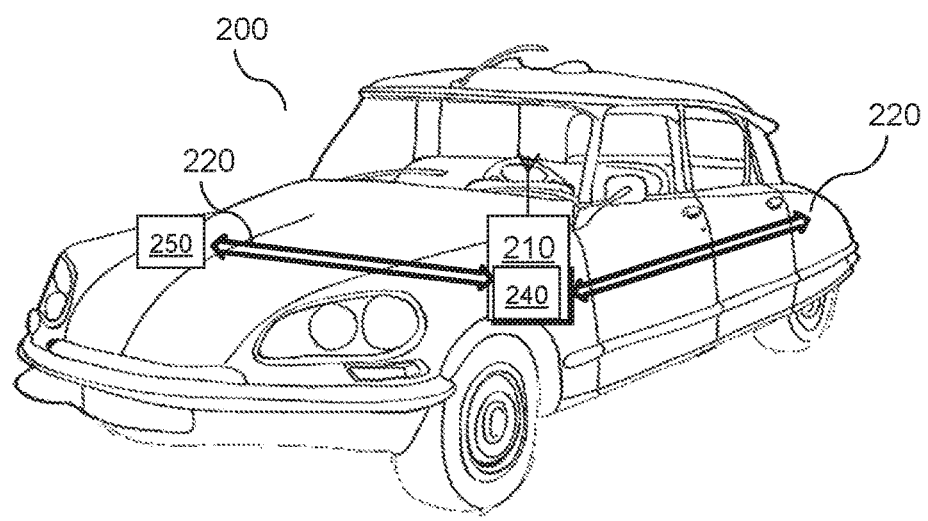
FIG. 2

INTELLIGENT TRANSPORTATION SYSTEM STATION, HOST PROCESSOR, VEHICLE AND METHOD THEREFOR

CROSS-REFERENCE TO RELATED APPLICATIONS

This application claims the priority under 35 U.S.C. § 119 of European Patent application no. 17203396.1, filed on 23 Nov. 2017, the contents of which are incorporated by reference herein.

FIELD OF THE INVENTION

The field of the invention relates to an intelligent transportation system (ITS) station, a host processor, a vehicle and a method therefor. The invention is applicable to, but not limited to, a mechanism to provide a combined message rate and modulation data rate congestion control strategy.

BACKGROUND OF THE INVENTION

It is known that road usage by vehicles continues to increase, year on year. Increased road usage causes many problems, such as increased congestion, longer travel time, higher travel costs, increased air pollution, increased accident risk, etc. In order to cope with this steady increase, solutions are required to better manage vehicle road usage. A possible solution is to construct new roads, which is unlikely to happen on a large enough scale. A further solution is to reduce traffic and/or provide alternative transportation options, neither of which is viable in most practical scenarios.

A further solution that is being widely researched and developed is the use of intelligent traffic (or transportation) systems (ITSs). The European Commission Mobility & Transport Department reported that more than one million traffic accidents have caused over 25,000 fatalities. As such, ITS has evolved to be a promising solution to improve traffic safety. ITS is being developed for a variety of applications, such as a stationary vehicle warning following an accident or vehicle problem, traffic condition warning (such as a traffic jam ahead warning), regulatory/contextual speed limits, road work warnings, detour notifications, etc. Some ITS solutions propose a communication backbone employing V2X communication (i.e. a vehicle-to-vehicle infrastructure).

In ITS, broadcasting of real-time information of cars, e.g. their positions and speed, road conditions, events and accidents, is performed in a form of beacon messages via a Vehicular Ad-hoc NETwork (VANET) built on IEEE 802.11p and a dedicated short-range communication (DSRC). The broadcast information is received from neighbouring vehicles, and enables nodes (sometimes referred to as ITS stations) to create a dynamic map of its neighbours and to some degree their operational status. This dynamic map helps to track the ITS station's neighbours and predict dangerous situations, thereby enabling various safety applications, as described in 'Intelligent Transport Systems (ITS); Vehicular Communications; Basic Set of Applications; Definitions' authored by the European Telecommunications Standards Institute (ETSI) Intelligent Transport Systems (ITS), Tech. Rep., 2009. It is anticipated that future autonomous vehicles will require even higher levels of safety, together with better supporting technologies in order to realize reliable safety applications.

Safety applications, such as ITS, require reliable communication in order to satisfy various technical constraints, such as minimum message rate and range. Such technical constraints need to be satisfied by all nodes/ITS stations within the 'awareness range' of the application. Awareness range is defined as the minimum distance between the vehicles at which the applications should predict a potential collision, such that the maneuver of vehicles would avoid a potentially catastrophic accident. In essence, an application requires 'N' packets to be received over a period of 'T' seconds from neighbours within its awareness range to ensure reliable functionality.

One known ITS station 100 is shown in FIG. 1. ITS station 100 includes a wireless transceiver integrated circuit (TRx IC) 108 that comprises a wireless transmitter and a wireless receiver connected to an antenna 102. The receiver is arranged to receive ITS messages broadcast from other local vehicles or fixed roadside units. The transmitter is arranged to broadcast ITS messages to other local vehicles or fixed roadside units.

The wireless TRx IC 108 is coupled to a baseband (BB) circuit 130, which may be of the form of a digital signal processor (DSP) and include, say, quadrature channel low pass filters (LPFs) and quadrature analog-to-digital converter (ADC) functionality. Communication between the wireless TRx IC 108 and the BB circuit 130 may use the IEEE 802.11p communication protocol. The IEEE 802.11p is an update to the IEEE 802.11 standard that adds wireless access in vehicular environments (WAVE), namely enhancements to 802.11 required to support ITS applications. This includes data exchange between high-speed vehicles and between the vehicles and the roadside infrastructure in the licensed ITS band of 5.9 GHz (5.85-5.925 GHz). IEEE 1609 is a higher layer standard based on the IEEE 802.11p. The BB circuit 130 typically performs the processing up to a data link layer (physical (PHY) layer and part of the medium access control (MAC) layer.

The system has a micro controller unit (MCU) 140 that is connected, via, say, a universal signal bus (USB) 138, to the BB circuit 130 that executes a protocol 1609 stack, and thus converts IEEE1609 messages into radio frequency (RF) signals for broadcasting. The MCU 140 is also coupled to a security circuit 150 that is used for signature generation for IEEE 1609.2 messages. ITS 100 is thereby able to receive 802.11p packets with messages from other vehicles, as well as transmit 802.11p packets with messages to other vehicles. In the current scenario 802.11 MAC would decide when a channel is free for it to broadcast the message. An ITS enabled vehicle broadcasts information to all other surrounding vehicles, which are similarly enabled. In this way, the surrounding vehicles can interrogate and process received ITS messages and build up an understanding of their surroundings vis-à-vis other vehicles or road events.

However, it is known that channel congestion is one of the most critical issues in IEEE 802.11p-based vehicular ad-hoc networks because congestion may lead to unreliability of applications. As a counter measure, ETSI proposed a mandatory Decentralized Congestion Control (DCC) framework to keep the channel load below a specific level in order to avoid such congestion. DCC algorithms are therefore focused on tuning one or more operational parameters, such as transmit power, message rate and modulation data rate, in order to avoid/limit congestion. One such algorithm tunes the message rate and transmit power according to a measured Channel Busy Percentage (CBP), which indicates a fraction of time that the channel is sensed busy by a vehicle. It is known, however, that this may have a negative impact on the application reliability. For example, a reduction of message rate will reduce the vehicle state information update rate in the VANET, thereby affecting the awareness refreshing rate of applications and thus jeopardize an application's reliability. Application reliability is strongly dependent upon an information update rate. A low update rate will delay the reaction of the application. It also reduces the chance to confirm a situation and make it less reliable for a vehicle to detect and predict a situation of other vehicles. Additionally, a safety application requires a certain message rate in order to reach its designed reliability. Hereafter, a reference to 'application reliability' is intended to cover one or more of various applications. In some examples, the 'application reliability' may be targeted towards safety applications, as they have stringent update rate (minimum message rate) and range requirements.

Furthermore, fair allocation of resources, such as message rate, transmit power, etc., is an important requirement for DCC algorithms. 'Fair allocation' means that vehicles experiencing similar channel loads, should be entitled to similar transmission parameters. An unfair allocation of resources may lead to a variation in range, message rate, etc., affecting application-reliability. A DCC algorithm may tune other transmission parameters, such as the modulation data rate, in order to reduce the message transmission duration in a busy channel, whilst keeping a higher message rate in order to provide better reliability even at high vehicular densities. Studies indicate that modulation data rate based congestion control strategies provide better application reliability than message rate or transmit power based congestion control strategies for various densities, although higher modulation data rate communication has range trade-off due to higher signal to interference plus noise ratio (SINR) requirements. Studies, thus far, have proposed combined message rate and transmit power strategies.

Thus, in summary, an unfair allocation of resource will cause different ITS stations with similar channel activity to have different transmission ranges, and also adversely affect applications that are in need of reliable information exchange. A more suitable, fairer, solution is desired.

SUMMARY OF THE INVENTION

The present invention provides an intelligent transportation system station, a host processor, a vehicle and a method therefor, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified known block diagram of an intelligent transportation system (ITS) station.

FIG. 2 illustrates a simplified diagram of a vehicle employing an ITS station, adapted to control broadcast ITS messages, and thereby channel load, using packet count and vehicle count to adjust message rate and modulation data rate, according to example embodiments of the invention.

DETAILED DESCRIPTION

Figure 3:
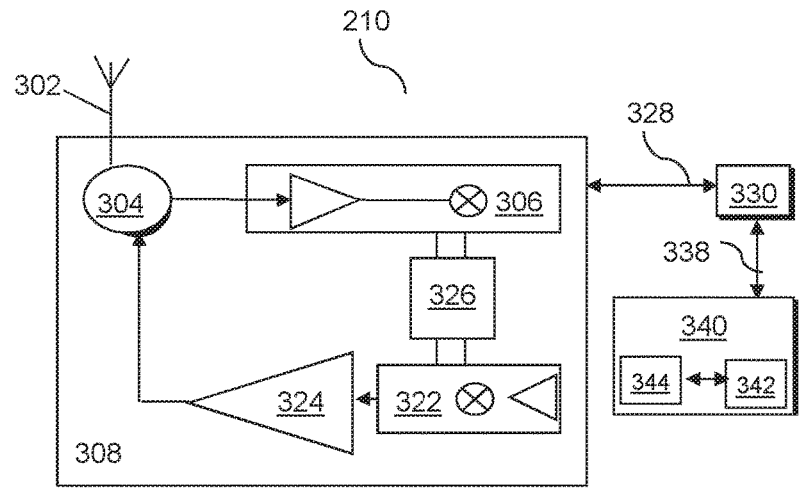
FIG. 3 illustrates a simplified first example block diagram of an ITS station, adapted to control broadcast ITS messages, and thereby channel load, using packet count and vehicle count to adjust message rate and modulation data rate, according to example embodiments of the invention.

The inventors of the present invention have recognized and appreciated that a mechanism to combine message rate and modulation data rate congestion control strategy (MD-DCC), in a cooperative manner, would address the aforementioned problems. In this manner, an approach to adjust a modulation data rate in order to increase channel capacity in some vehicle density scenarios, has a lower range trade-off than known transmit power based strategies. An MD-DCC solution, as described below, benefits from the best of both message rate algorithm and modulation data rate algorithm implementations. MD-DCC tunes the message rate and modulation data rate cooperatively in order to avoid congestion and satisfy the beacon reception requirements ('N' packets in 'T' seconds) of the application to a useful (and potentially) maximum possible extent. In this manner, the application reliability performance is improved, even in higher vehicle density scenarios. Examples of the invention propose to adjust a broadcast message rate to be greater than, or equal to, a minimum message rate that is required by the application. In high vehicle density scenarios, examples of the invention propose to additionally adjust a modulation data rate in a cooperative manner in order to achieve a high channel capacity.

In the context of the present invention, the term 'message rate' encompasses and may refer to a total number of packets that are sent over a channel per second. In Standards, a typical message rate may vary from 1 to 10 Hz. In the context of the present invention, the term 'modulation data rate' encompasses and may refer to an indication of a total number of bits that are transmitted per second, for example, taking discrete values 3, 4.5, 6, 9, 12, 18, 24 and 27 Mbps A packet-count and vehicle count approach enables a fair-allocation of channel resources in order to improve a fairness of a Decentralized Congestion Control (DCC) algorithm. Fair allocation means that vehicles experiencing similar channel loads, should be entitled to similar transmission parameters. An unfair allocation of resources may lead to variation in range, message rate, etc. affecting application-reliability. In examples of the invention, a fair-usage of channel resources may be implemented in terms of adjusting both of message rate and modulation data rate, in response to the determined packet count and a determined number of vehicles within a range. In some examples, the use of MD-DCC enforces a homogeneous modulation data rate selection amongst all vehicles, thereby providing fairness throughout the VANET. Furthermore, in some examples, the fairness can further improve the application reliability increasing safety.

Examples of the invention find applicability in networks that use multiple modulation data rates, as the concepts herein described may improve the application reliability in heavy traffic situations, particularly when a message rate and modulation data rate, from a plurality of selectable modulation data rates, may be selected by the respective ITS stations.

Aspects of the invention describe an intelligent transportation system (ITS), for a vehicle, a vehicle and a host processor configured to support ITS operations. The ITS, vehicle and/or host processor includes a packet count and vehicle count estimator arranged to receive broadcast ITS transmissions from a plurality of neighbouring vehicles and provide an indication of a number of the plurality of vehicles and a number of packets received from the plurality of neighbouring vehicles. A fair resource allocator circuit operably coupled to the packet count and vehicle count estimator and configured to adjust a broadcast message rate and a modulation data rate of an ITS transmission based on the number of the plurality of vehicles and the indication of the number of received packets; and a transmitter operably coupled to the fair resource allocator circuit and configured to broadcast at least one ITS message using the adjusted broadcast message rate and adjusted modulation data rate.

In this manner, the fair resource allocator is able to adjust a broadcast message rate and a modulation data rate of an ITS transmission based on a packet count and vehicle count estimate. Thus, a better representation of a channel load in an ITS may be achieved compared to the known approach to use solely a CBR measurement.

In some examples, a channel busy percentage, CBP, circuit, operably coupled to the packet count and vehicle count estimator and the fair resource allocator circuit may be arranged to sense when a communication channel is being used to receive ITS information and provide an indication of a time that the channel is in use to produce a CBP value. The fair resource allocator circuit may be configured to additionally receive the CBP value, and adjust the broadcast message rate and modulation data rate of the ITS message based on the CBP value.

In some examples, the fair resource allocator circuit may be configured to additionally receive an indicator of at least one ITS application reliability requirement, and adjust the broadcast message rate and modulation data rate of the ITS message based on the at least one ITS application reliability requirement. In some examples, the fair resource allocator circuit may adjust the broadcast message rate and modulation data rate of the ITS message by maintaining a message rate above, or equal to, $M_{min}$ and selecting a minimum possible modulation data rate that enables a maximum possible awareness range. The channel capacity can be increased by selecting higher modulation data rate. However, a use of higher modulation data rates decreases communication (awareness) range. Thus examples of the invention propose to select a least possible modulation data rate such that the communication range (or awareness range) is maximized, thereby Increasing the modulation data rate to no more than needed.

In some examples, the packet count and vehicle count estimator may estimate a packet reception ratio (p) and a number of vehicles using the received messages from other vehicles and the CBP value using a time window and at least one awareness range setting.

In some examples, a number of vehicles $V_d$ is estimated using $$V_d = \frac{P_C}{R_{min}}$$

where: $P_C$ represents the total number of packets sensed by a vehicle over a first period, and $R_{min}$ represents a minimum transmission message rate used over a second period. In some examples, the ITS station may include a memory coupled to the fair resource allocator circuit and packet count and vehicle count estimator and configured to store and have extracted historical vehicle density and environmental information, vehicle count ($V_d$) estimation.

In some examples, the ITS may be configured to provide an indication of the adjusted at least one ITS broadcast transmission parameter to a vehicle to roadside (V2X) infrastructure or on a vehicle to vehicle (V2V) basis. In some examples, the ITS may support a plurality of different modulation data rates and the fair resource allocator circuit switches the ITS broadcast transmission between two of the plurality of different modulation data rates based on at least in part the indication of a number of the plurality of vehicles and a number of packets received from the plurality of neighbouring vehicles.

Referring now to FIG. 2, a simplified diagram of a vehicle 200 employing an ITS station 210, adapted to control broadcast ITS messages, and thereby channel load, based on packet count and a determined vehicle count, is illustrated according to example embodiments of the invention. The ITS station includes a packet count and vehicle count estimator arranged to receive and process (or receive processed) broadcast ITS transmissions from a plurality of neighbouring vehicles and provide an indication of a number of packets received from the plurality of neighbouring vehicles, and the number of communicating vehicles; and a fair resource allocator circuit operably coupled to the packet count estimator and configured to adjust at least message rate and modulation data rate in the ITS broadcast transmission based on the indication of the number of received packets and the number of determined neighbouring vehicles. The ITS station further includes a transmitter operably coupled to the fair resource allocator circuit and configured to broadcast at least one ITS message using the adjusted message rate and modulation data rate in the ITS broadcast transmission.

Examples of the invention assist in determining an awareness range of neighbouring vehicles, as required by safety applications for vehicles travelling at certain speeds and with certain reaction times of the driver. In particular, examples of this invention propose a mechanism to calculate a minimum message transmission rate ($M_{min}$) for the beacon reception requirements of the safety applications. According to the road situation (e.g. number of lanes), examples of this invention select a maximum number of vehicles ($V_{dmax}$) within the range, and which the MD-DCC fair resource allocator is able to support. Using the $M_{min}$, $V_{dmax}$ and a target Channel Busy Percentage ($CBP_T$), the lowest permissible modulation data rate may be calculated, with which the minimum message transmission rate $M_{min}$ can be guaranteed to satisfy the application reliability with the channel load below a threshold to avoid channel congestion. In this manner, the message rate and modulation data rate may be adjusted in a cooperative manner. Furthermore, in some examples, using the measured CBP and the number of vehicles within range of the vehicle in real time, examples of the invention may be configured to adjust to use the best modulation data rate and/or the minimum acceptable message rate [$M_{min}$, 10 Hz] in order to further improve reliability or the awareness range. In other words, the MD-DCC fair resource allocator attempts to satisfy beacon requirements of an application, at the same time maximizing the awareness range.

In this example, the ITS station 210 comprises an MCU 240 operably coupled to other circuits and components (not shown). The MCU 240 is operably coupled to other components or circuits in the vehicle, e.g. a speed sensor 250, via, say, an integrated communication bus network 220, such as a Controller Area Network (CAN or CAN-bus) or a Local Interconnect Network (LIN). A CAN or CAN-bus is a vehicle bus standard that is designed to allow microcontrollers and devices to communicate with each other within a vehicle without a need for a host computer. LIN is a serial network protocol used for communication between components in vehicles. In this example, the MCU 240 is adapted to control a message rate and modulation data rate of broadcast ITS messages, and thereby channel load, based on a determined number of neighbouring vehicles and packet count, as described below.

Although examples of the invention are described with reference to a vehicle such as a car, as illustrated in FIG. 2, it is envisaged that any road transport device may use the concepts herein described, such as trucks, motorcycles, buses, etc.

Referring now to FIG. 3, a simplified example block diagram of an ITS station (ITS) 210, adapted to control a rate of broadcast ITS messages, and thereby channel load, based on packet count and a determined number of neighbouring vehicles, is illustrated according to example embodiments of the invention. The ITS station 210 includes a wireless transceiver integrated circuit 308 that comprises a wireless transmitter and a wireless receiver connected to an antenna 302 via an isolation component or circuit 304, which may be a duplex filter or antenna switch that isolates signals between the transmitter and receiver circuits. In this example, the wireless transceiver integrated circuit 308 is configured to operate at 2.4 GHz or 5.9 GHz.

One or more receiver chains, as known in the art, include(s) receiver front-end circuitry 306 (effectively providing reception, low-noise amplification, filtering and intermediate or base-band frequency conversion). In example embodiments, the receiver receives a radio frequency, RF, signal and converts the received RF signal to a digital quadrature received signal. The receiver front end circuit 306, for example, may comprise a low noise amplifier (LNA) coupled to two frequency down-conversion quadrature mixers, fed from a quadrature local oscillator 326. The receiver front-end circuitry 306 is arranged to receive ITS messages broadcast from other local vehicles or fixed roadside units.

In a transmitter chain sense, the transmitter comprises quadrature frequency up-conversion circuit 322, which contains quadrature up-mixer circuit(s) and may contain amplification and additional filtering circuits, arranged to up-convert differential quadrature signals 328 from baseband (BB) circuit 330 which includes quadrature digital-to-analog converters (DACs). The frequency up-conversion circuit 322 combines the two resultant mixed quadrature signals before being input to power amplifier (PA) 324, which amplifies the combined signal prior to transmission. PA 324 outputs the up-converted and amplified transmit signal to isolation component or circuit 304 and thereafter antenna 302. The transmitter is arranged to broadcast ITS messages to other local neighbouring vehicles or fixed roadside units.

The receiver front end circuit 306 is also coupled to BB circuit 330, which may be of the form of a digital signal processor (DSP) and comprise quadrature channel low pass filters (LPFs) and quadrature analog to digital converters ADCs. Communication between the wireless transceiver integrated circuit 308 and the BB circuit 330 may use the 802.11p communication protocol. The BB circuit 330 performs the processing up to a data link layer (physical (PHY) layer and part of the medium access control (MAC) layer). The ITS station 210 has a microcontroller unit (MCU) 340, sometimes referred to hereafter as a host processor, which is connected, via say a universal signal bus (USB) 338 or SDIO or Ethernet interface, to the BB circuit 330. The BB circuit 330 executes an IEEE1609 stack, and thus converts IEEE1609 messages into RF signals for broadcasting. The MCU 340 includes a packet count and vehicle count circuit 342 (or logic) configured to count a number of packets received by broadcast transmissions from a determined number of neighbouring vehicles.

In some examples, packet count and vehicle count circuit 342 calculates a packet count ($P_C$) for each data packet received from each neighbouring ITS station/node, based on information received from the physical layer communications. The total transmitted packets $P_T$ at an ITS station/node, and the total time taken or transmission $T_{TX}$ over a period θ, can be obtained from this physical layer data. In some examples, such a packet count is performed only when the channels is sensed as being busy. In this example, there are three instances where the channel may be sensed as being 'busy', e.g. when: (i) the node is transmitting a packet; (ii) the node is receiving a packet; (iii) the node is neither transmitting nor receiving, however the signal strength is identified as being higher than a Carrier Sensing Threshold (CST), due to collisions, interference, etc.

In this example, packet count and vehicle count estimator 342 estimates the packet reception ratio (p) and the number of vehicles using the received messages from other vehicles. In this example, the packet count and vehicle count estimator 342 also uses CBP values, for example to obtain a better estimation of packet count. In some examples, the number of vehicles $V_d$ may be estimated using Equ.[3], which can be used to select the best modulation data rate in Equ.[2], instead of using the $V_{dmax}$.

It is envisaged in other examples that the packet count ($P_C$) estimation may be performed by various other approaches, such as machine learning, adaptive error correction, etc., in order to further improve accuracy.

The packet count and vehicle count circuit 342 is thus arranged to receive broadcast ITS transmissions from a plurality of neighbouring vehicles and provide an indication of a number of packets received from the plurality of neighbouring vehicles, where the indication may include at least an information length and a modulation data rate of the received packets, as well as an indication of the number of vehicles that have been counted. In this example, the packet count and vehicle count circuit 342 is coupled to a fair resource allocator circuit 344, which in some examples may include a message rate control circuit and modulation data rate control circuit configured to adjust, at least, a rate of broadcast ITS messages and/or the modulation data rate of broadcast transmissions, based on the indication of the number of received packets and the vehicle count. The ITS station 210 further includes a transmitter operably coupled to the fair resource allocator circuit 344 and configured to broadcast at least one ITS message using the adjusted message rate and modulation data rate.

In examples of the invention, the fair resource allocator circuit 344 is an MD-DCC resource allocator that selects the best modulation data rate and message rate, periodically (e.g. every 100 msec.), using the application reliability requirements and measured CBP, vehicle counts and message reception rate, and thus controls the message transmission to avoid channel congestion with the desired application reliability. In some examples, the modulation data rate may be determined using the method in Equation 2. When the modulation data rate is selected, the resource allocator selects or tunes the message rate using one of different possible message rate DCC algorithms, e.g. using the CBP and LIMERIC algorithm and/or using the vehicle count and an SAE DCC algorithm, as described in J2945/1 'On-Board System Requirements for V2V safety Communications', SAE International, 2016, if the derived TX message rate is higher than the minimum required message rate $M_{min}$. Vehicles using legacy algorithms such as LIMERIC have a minimum message-rate of 1 Hz (Mmin0) and a fixed modulation data rate (D0) of 6 Mbps. In some examples, it is envisaged that other algorithms may be used within the concepts described herein, as mentioned in the paper from the inventors of the present invention (and Ignas Niemegeers), titled: 'A Combined Fair Decentralized Message-Rate and Data-Rate Congestion Control for V2V Communication'.

The packet count and vehicle count information is then utilized to select a minimum possible modulation data rate to avoid congestion and enables a maximum possible range and reliability of safety applications.

In some examples, a receiver circuit (including the MCU 340) may be configured to measure the channel busy period (CBP) for a CBP circuit 430 to estimate the CBP values. The MCU 340 may be configured to support multiple message rates for broadcast ITS transmissions and select a message rate for use, based on the CBP values from fair resource allocator circuit 344. The MCU 340 may also configure a modulation data rate to support a desired message rate based on the CBP, a previous message rate, a determined packet count and vehicle count, using fair resource allocator circuit 344. If the MCU 340 determines, after processing the packet count information, that the message rate and/or modulation data rate of the ITS transmissions from the vehicle is to be reduced, the MCU 340 may be configured to adapt the message rate and/or modulation data rate of ITS messages that are broadcast from the vehicle, and vice versa.

Furthermore, in this manner and when employed in multiple vehicles, the ITS application itself, within each of a majority or all of a number of localised vehicles, may be configured to intelligently decide on a message rate and modulation data rate of messages (and in some examples another parameter associated with the ITS transmissions) that it is going to broadcast in a given time period. In this manner, a number of vehicles that are in a localised area and, say, moving slowly due to a traffic jam, may each increase the modulation data rate of ITS messages that they broadcast, which will in turn not reduce too much the number of received ITS messages that they receive and process. The vehicles use these ITS messages to calculate the positions of the vehicles around it. Therefore, even for a slow moving vehicle with an increase modulation data rate of messages, it is still possible to calculate its relative position, vis-à-vis other vehicles in its vicinity.

In some instances, this decision may subsequently include dynamically varying the modulation data rate and message rate of ITS messages sent by each vehicle, proportional to the determined packet count and vehicle count performed by each vehicle. When applied by multiple vehicles, the modulation data rate and message rate of ITS messages that each vehicle needs to process is effectively impacted. Thereafter, for example and in response to an adjustment of a modulation data rate used for ITS transmissions in slow-moving traffic, it is envisaged that the vehicles create enough channel capacity to process a same number of messages/second irrespective of traffic/vehicle density.

MD-DCC attempts to satisfy beacon requirements of an application, at the same time maximizing the awareness range. Below more details are presented on how modulation data rate and message rate tuning are performed, and how they are linked to the beacon message requirements.

The minimum message transmission rate, $M_{min}$, may be obtained based on the beacon requirements ('N' packets in 'T' seconds) of the application, the required application reliability ($R_{app}$) and the packet reception ratio (p) that is experienced or estimated by the vehicle, where $M_{min}$ may be defined as the least possible integer from '1' to '10' that satisfies equation [1].

$$R_{app} \geq \sum_{N}^{M_{min}} \binom{M_{min}}{N} p^N (1-p)^{M_{min}-N} \qquad \text{Equation 1}$$

For example: Let us consider an application that requires 'N=1' packets in a period of 'T=1' second, with $R_{app}$=0.99 and p=0.7. Thus, the $M_{min}$ required to support the application reliably is 4 Hz. Keeping the message transmission rate higher than the minimum message rate will guarantee reliable functioning of the safety application.

Each vehicle can select a minimum message rate that satisfies the equation below. The message rate adaptation can be performed e.g. every 1 sec:

$$\frac{(V_{d\,max} \times M_{min} \times T_D)}{\gamma} \leq \frac{(CBP_T)}{100} \qquad \text{Equation 2}$$

Where: $T_D$ represents a packet transmission time of different message rate 'D'. The selection of modulation data rate can be based on maximum number of vehicles ($V_{dmax}$) or a measured number of vehicles obtained using a sliding window on $V_d$ over a period of λ, where $V_d$ calculation as shown below:

$$V_d = \frac{P_C}{R_{min}} \qquad \text{Equation 3}$$

Where $P_C$ represents the total number of packets sensed by a vehicle over a period of 1 sec calculated as in [6] and $R_{min}$ represents the minimum transmission message rate used over a period of γ sec.

When the message rate does not need to be changed, the message rate can be tuned as described in the LIMERIC document, authored by J. B. Kenney, G. Bansal, and C. E. Rohrs, "LIMERIC: A linear message rate control algorithm for vehicular DSRC systems." in *Proc. 8th ACM Int. Workshop Veh. Inter-Netw. (VANET)*, 2011, pp. 21-30), based on the CBP measurements. The CBP measurements are performed by each vehicle independently. LIMERIC is a distributed linear adaptive algorithm that forces the channel load to converge to the channel load threshold ($CBP_T$). $CBP_k(t)$ is the channel load computed by vehicle k at time t, the message rate $R_k$ is adjusted every θ seconds as follows:

$$R_k(t) = (1-\alpha) \times R_k(t-\theta) + \beta \times (CBP_T - CBP_k(t-\theta)) \qquad \text{Equation 4}$$

Where the speed of convergence is determined by α, and β ensures stability and steady state convergence. The message rate in MD-DCC varies between 10 Hz (maximum message rate as per standard) and minimum message rate $M_{min}$ that is required to reliably support the application.

The value of β is derived based on $M_{min}$ of an application, as shown below, to further improve the application reliability:

$$\beta = \frac{(1-\alpha) \times M_{min}}{CBR_T} \quad \text{Equation 5}$$

In some examples, the host processor may be configured to maintain a minimum rate of messages/second to be sent out. In this manner, the host processor ensures that other moving vehicles are informed about the vehicle's position. In some examples, the minimum rate of messages/second to be sent out may include any mandatory messages that are to be sent, such as safety messages, e.g. an SOS message, a vehicle breakdown message, a message following a crash, etc.

Figure 4:
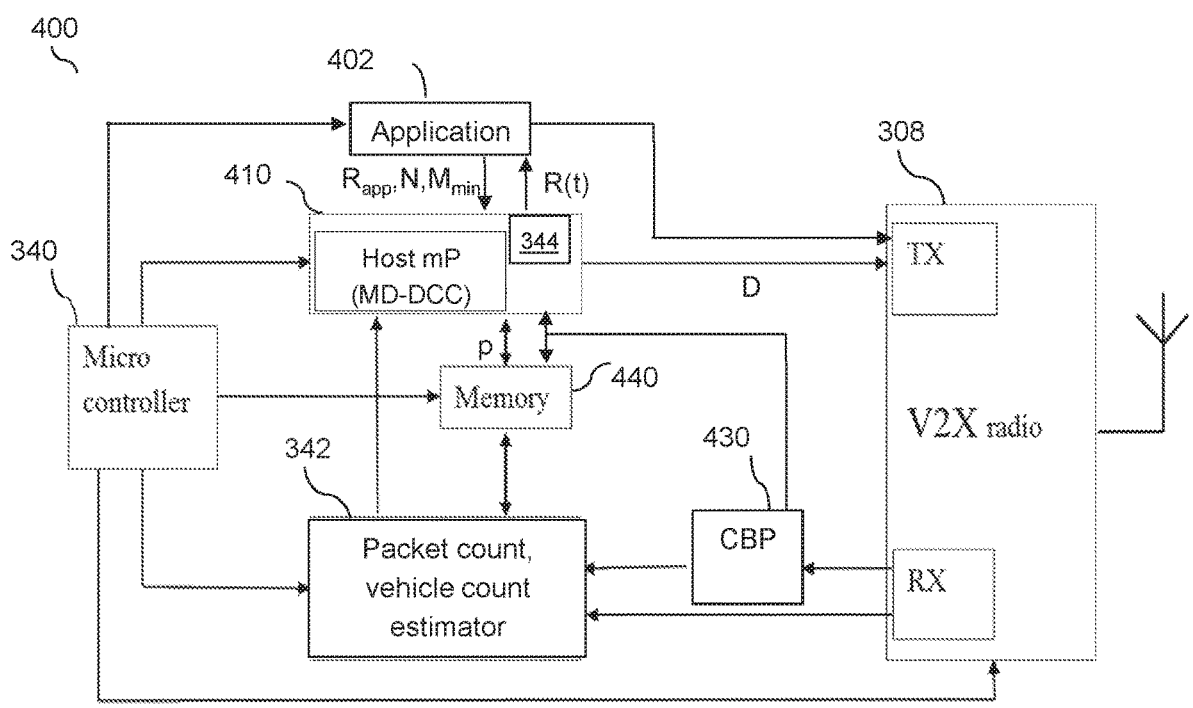
FIG. 4 illustrates a more detailed second example block diagram of an ITS station that supports a combined message rate and modulation data rate congestion control strategy configured to function in a cooperative manner, according to example embodiments of the invention.

Referring now to FIG. 4, a simplified example of an ITS station, adapted to have a combined message rate and modulation data rate congestion control strategy (MD-DCC) where the message rate and modulation data rate are adjusted in a cooperative manner, is illustrated according to example embodiments of the invention. In this example, a host processor, such as MCU 340 from FIG. 3, is configured to perform a number of ITS functions, including implementing a combined message rate and modulation data rate congestion control based MD-DCC technique according to some examples of the invention. Although, in this example the implementation of a combined message rate and modulation data rate congestion control based MD-DCC technique resides in MCU 340, it is envisaged that in other examples the functionality may reside in stand-alone circuits or logic or processors coupled to the MCU 340.

In accordance with some examples, a packet count and vehicle count estimation circuit 342, which may be in a form of a processor, calculates a packet count and vehicle count for each received signal based on physical layer information from a receiver (Rx) in, say, wireless TRx IC 308. The RX module measures the channel busy period (CBP) for a CBP circuit 430 to estimate the CBP values. The CBP values and received packet information are used by the packet count and vehicle count estimation circuit 342 to estimates the packet reception ratio (p) and the number of vehicles using the received messages from other vehicles and the CBP values with time windows and awareness range settings. The number of vehicles $V_d$ is estimated using Equ.[3], which can be used to select the best modulation data rate in Equ.[2], instead of using the $V_{dmax}$.

In some examples, depending upon how the receiver senses the channel, the modulation data rate information that is present in a packet header itself may be used to calculate a total time taken by a packet. In some examples, no additional information needs to be taken into account. In some examples, the packet count and vehicle count estimation may be based on a total number of packets sent, received, and a total number of packets sensed by the physical layer, whilst the channel is busy, without the vehicle sending or receiving a packet over a period θ.

In some examples, the packet count and vehicle count ($V_d$) may be further improved by using stored historical measured information, vehicle density and environmental information, stored in memory 440 or accessible real-time from an advanced Road-Side-Unit with a memory storage (not shown). For instance, if packets from a car were counted in the previous period, but not received in the current period, and the road is a closing highway and the vehicle is very-likely still in the range, the packet count of the neighbouring vehicle in the previous period can be factored into the count in the current period. In some examples, sliding window filtering based on previous measured historical information can improve packet count. In some examples, such additional stored information may be useful when the channel does not have a good packet reception ratio and is heavily congested (e.g. 95% or greater).

In this example, once both a packet count and vehicle count are estimated by packet count and vehicle count estimation circuit 342, the ITS station 400 is able to tune or adapt multiple parameters, such as message rate and modulation data rate in a cooperative manner, and combine this strategy at the transmitter (TX) based on one or more MD-DCC resource allocator algorithm(s) that is used, in order to transmit messages at the best modulation data rate and message rate to avoid channel congestion with the desired application reliability.

In this regard, host processor 340 is configured to determine and implement a fair resource allocation based on MD-DCC and selects the best modulation data rate and message rate periodically (e.g. every 100 msec.), using the application reliability requirements 402 and measured CBP from CBP circuit 430, vehicle count and message reception (packet count) rate, and thereafter control the message transmission to avoid channel congestion with the desired application reliability. In some examples, the host processor 340 implementing a fair resource allocation based on MD-DCC may also perform an ITS message generation function that includes adaptively modifying a rate of broadcasting ITS messages to other vehicles.

In some examples, the modulation data rate is determined using the method in Equ.[2]. When the modulation data rate is selected, the host processor 340 implementing a fair resource allocation based on MD-DCC may select or tune the message rate using different message rate DCC algorithms, e.g. using the CBP and a known algorithm such as LIMERIC or using a vehicle count and a SAE DCC algorithm, if the derived transmit message rate is higher than the minimum required message rate $M_{min}$. The host processor 340 implementing a fair resource allocation based on MD-DCC takes the application requirements from 402 and satisfies them by maintaining a message rate above or equal to the $M_{min}$, and selects a minimum possible modulation data rate that enables a maximum possible awareness range, and enforces a homogeneous message rate and modulation data rate selection amongst all vehicles that provides fairness. This fair-usage of channel resources, in adjusting the message rate and modulation data rate in a cooperative manner, further improves application reliability.

In examples where the LIMERIC algorithm is used to adjust message rate at a selected modulation data rate, the method in Equ.[5] is used for β adaption based on $M_{min}$. The β adaption further improves the channel utilization making CBP closer to the target $CBP_T$ satisfying application requirements. Alternatively, in examples where a SAE DCC algorithm is used to adjust message rate at a selected modulation data rate, the message length at the modulation data rate (e.g. $T_D$ in Equ.[2]) may be used to adjust the message rate (Max_ITT) using B and vMax_ITT in Eq.7 from the SAE standard, "J2945/1 On-Board System Requirements for V2V safety Communications", SAE International, 2016.

In some examples, the minimum required message rate ($M_{min}$) may be determined by the method in Equ.[1] using the application requirements (N, T), the minimum required application reliability value ($R_{app}$) and the channel characteristics (packet reception ratio 'p') at the host processor 340 implementing a fair resource allocation based on MD-DCC, in runtime. Thus, in this manner, adaption of $M_{min}$ based on channel behaviour may be achieved that enables a reliable quality of service (QoS) to satisfy the application requirements of 402.

In some examples, it is envisaged that the packet count and vehicle count estimator circuit 342 may be configured to receive broadcast ITS transmissions from a plurality of neighbouring vehicles and provide an indication of a number of packets received from the plurality of neighbouring vehicles, where the indication includes at least an information length and a modulation data rate of the received packets.

In this example, the transceiver integrated circuit 308 and associated baseband circuitry may also perform V2x Wireless MAC layer functionality, for example consistent with European Telecommunication Standards Institute (ETSI) ES 202 663 and in accordance with IEEE1609.4, In this example, the transceiver integrated circuit 308 and associated baseband circuit may also perform V2x Wireless physical (PHY) layer functionality, for example consistent with IEE802.11p, ETSI ES 202 663 and in accordance with ISO21215. It is understood that the standards that are adopted around the World may vary, and thus the examples described above, when employed in other implementations, may be replaced by similar technologies or Standard specifications other than IEEE1609.

In some examples, a host processor may be the main or sub control unit in the vehicle. In some examples, the host processor may have one or more micro controller units (MCUs), of which one of the MCUs might be configured to adaptively control a usage of resource when broadcasting ITS messages, and thereby control or influence message transmissions (e.g. best modulation data rate and message rate) in the system/VANET, based on packet count and vehicle count and application reliability requirements.

In some examples, the wireless transceiver integrated circuit 308 maybe also coupled to a user interface circuit, for example a human-machine interface (HMI), which is capable of receiving an SOS message or displaying information relayed from emergency input circuit. In some examples, the data acquisition circuit of the host processor may be configured provide warning information, say via an audible or visual warning, indicative of sudden breaking of either the vehicle or surrounding vehicles.

In this manner, in one example, physical layer information obtained from, say, V2X (and/or a V2V) MAC and physical layer circuit may be processed by the packet count and vehicle count measurement circuit of a data acquisition circuit and routed to a MD-DCC fair resource allocator circuit of the ITS application circuit. Based on the packet count and vehicle count information, the MD-DCC fair resource allocator circuit may select or influence the intelligent message rate and modulation data rate circuit to, say, adapt a modulation data rate of ITS messages and message rate above or equal to $M_{min}$, that are generated by message generation circuit and ultimately broadcast by the vehicle. In some examples, the information processed by the MD-DCC fair resource allocator may include an indication of the application reliability requirements and measured CBP, vehicle counts and message reception rate.

In some examples, the modulation data rate of various packets received by the RX can be utilized by the host processor 340 implementing a fair resource allocation based on MD-DCC to obtain the global picture of modulation data rates used by the vehicles in the communication range, including vehicles using legacy single-modulation data rate DCC algorithms. This global picture of modulation data rates and message rates can be used by the host processor 340 implementing a fair resource allocation based on MD-DCC to find the number of vehicles using legacy algorithms only (e.g. Vd0) and the number of vehicles using the concepts described herein (e.g. Vd1). In this manner, the host processor 340 may be able to compensate for the differences there between in Equ.[2] (e.g. by splitting the left side of Equ.[2] to represent $V_{d1} \times M_{min1} \times T_{D1} + V_{d0} \times M_{min0} \times T_{D0}$ whereby the first part identifies the number of vehicles adapted in accordance with examples of the invention and the second part indicates the number of legacy vehicles), in order to keep avoiding channel congestion with legacy vehicles and further improve fairness of MD-DCC. Thus, in this manner, a modification of Equ.[2] may be used to realize embodiments of the invention and taking into account a coexistence with legacy vehicles.

In some examples, the host processor 340 implementing a fair resource allocation based on MD-DCC may be configured to process the received packet count information and log the data in memory (not shown), so that the data, or the subsequent changes effected with one or more resources, can be subsequently used by the vehicle's ITS station.

In some examples, the host processor may be configured to process the packet count and vehicle count information and provide any information relating to a MD-DCC fair resource allocation amongst a number of ITS stations/vehicles to a V2X infrastructure, e.g. for monitoring and broadcast to all users for centrally-controlled safety-related purposes.

Figure 5:
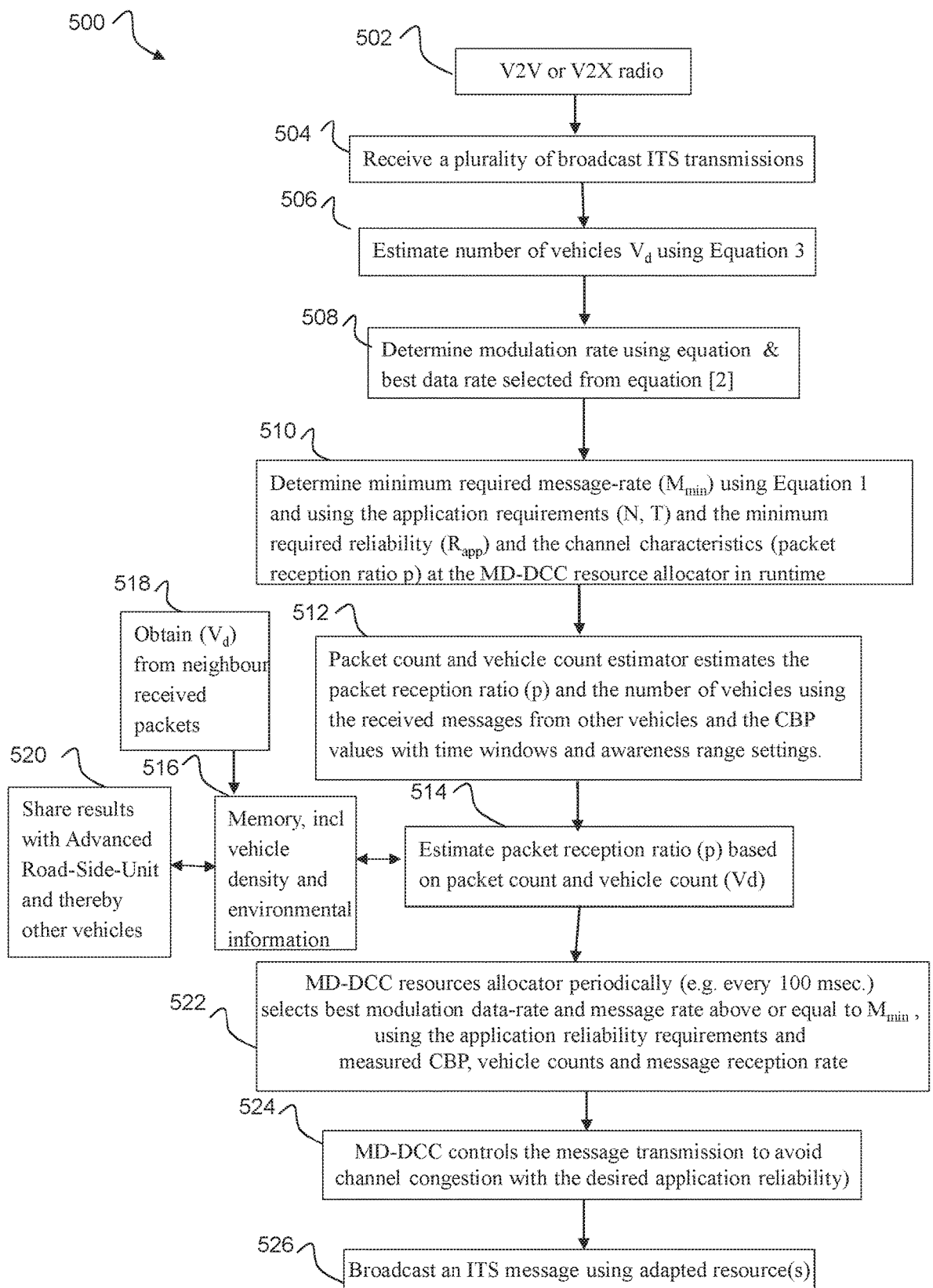
FIG. 5 illustrates an example flow chart for controlling broadcast ITS messages in an intelligent transportation system based on a combination of message rate and modulation data rate congestion control (MD-DCC), according to example embodiments of the invention.

Referring now to FIG. 5, an example flow chart 500 for controlling broadcast ITS messages in an intelligent transportation system based on a combination of message rate and modulation data rate congestion control (MD-DCC) is illustrated, according to example embodiments of the invention. The flowchart 500 starts with a vehicle at 502 with an ITS station capable of operating in a vehicle to vehicle (V2V) or vehicle to roadside infrastructure (V2X) mode of operation. At 504, the ITS station receives broadcast ITS transmissions from a plurality of neighbouring vehicles. At 506, the ITS station estimates the number of vehicles $V_d$, for example using Equ.[3]. In some examples, at 508, the ITS station may then determine a message rate using Equ.[4], for example using a best modulation data rate selected from equation [2]. In this manner, the message rate and modulation data rate may be adjusted in a cooperative manner. At 510, the ITS station determines minimum required message rate ($M_{min}$) using Equation 1 and using the application requirements (N, T) and the minimum required reliability ($R_{app}$) and the channel characteristics (packet reception ratio p) at the MD-DCC resource allocator in runtime. At 512, packet count and vehicle count estimator estimates the packet reception ratio (p) and the number of vehicles using the received messages from other vehicles and the CBP values with time windows and awareness range settings. At 514, the ITS station estimates a packet reception ratio (p) based on packet count and vehicle count (Vd). In some examples, this information may be stored in memory at 516. In some examples, the memory may also store information such as historical vehicle density information and environmental information. In some examples, at 520, this information may be shared with an Advanced Road-Side-Unit, and thereby other vehicles. In some examples, the stored information may include a vehicle count (Vd) that may be obtained using information from neighbour received packets at 518.

At 522, the MD-DCC resources allocator periodically (e.g. every approx. 100 msec.) selects best modulation data rate and message rate above or equal to $M_{min}$, using the application reliability requirements and measured CBP, vehicle counts and message reception rate. At 524, the MD-DCC controls the message transmission to avoid channel congestion with the desired application reliability). At 526, at least one ITS message is broadcast using the adjusted at least one ITS broadcast transmission parameter.

In some examples, the circuits herein described may be implemented using discrete components and circuits, whereas in other examples the circuit may be formed in integrated form in an integrated circuit. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A skilled artisan will appreciate that the level of integration of processor circuits or components may be, in some instances, implementation-dependent. Furthermore, a single processor or MCU may be used to implement a processing of CBP information as well as performing a packet count of received ITS signals from other vehicles, as well as some or all of the other mentioned MCU functions. Clearly, the various components within the ITS can be realized in discrete or integrated component form, with an ultimate structure therefore being an application-specific or design selection. Examples of the invention find applicability in a wide variety of applications, including Intelligent Transportation Systems (ITS), safety applications, congestion avoidance techniques, wireless monitoring systems and applications, Internet-of-Things, etc.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the host processor for an intelligent transportation system, ITS, for a vehicle, may be implemented as circuitry located on a single integrated circuit. Here, the host processor circuitry for a vehicle comprises: a packet count and vehicle count estimator arranged to receive broadcast ITS transmissions from a plurality of neighbouring vehicles and provide an indication of a number of the plurality of vehicles and a number of packets received from the plurality of neighbouring vehicles. A fair resource allocator circuit is operably coupled to the packet count and vehicle count estimator and configured to adjust a broadcast message rate and a modulation data rate of an ITS transmission based on the number of the plurality of vehicles and the indication of the number of received packets; and a transmitter operably coupled to the fair resource allocator circuit and configured to broadcast at least one ITS message using the adjusted broadcast message rate and adjusted modulation data rate.

Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired packet counting and processing by operating in accordance with suitable program code, such as minicomputers, personal computers, automotive and other embedded systems, cell phones and various other wireless devices, commonly denoted in this application as 'computer systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. An intelligent transportation system, ITS, station for a vehicle, the ITS comprising:
    a packet count and vehicle count estimator arranged to receive broadcast ITS transmissions from a plurality of neighbouring vehicles and provide an indication of a number of the plurality of vehicles and a number of packets received from the plurality of neighbouring vehicles;
    a fair resource allocator circuit operably coupled to the packet count and vehicle count estimator and configured to adjust a broadcast message rate and a modulation data rate of an ITS transmission in a cooperative manner based on application reliability requirements, the number of the plurality of vehicles and the indication of the number of received packets; and
    a transmitter operably coupled to the fair resource allocator circuit and configured to broadcast at least one ITS message using the adjusted broadcast message rate and adjusted modulation data rate;
    wherein a number of vehicles $V_d$ is estimated using $$V_d = \frac{P_C}{R_{min}}$$

where $P_C$ represents the total number of packets sensed by a vehicle over a first period, and $R_{min}$ represents a minimum transmission message rate used over a second period.

2. The ITS station of claim 1 further comprising a channel busy percentage, CBP, circuit, operably coupled to the packet count and vehicle count estimator and the fair resource allocator circuit and arranged to sense when a communication channel is being used to receive ITS information and provide an indication of a time that the channel is in use to produce a CBP value.

3. The ITS station of claim 2 wherein the fair resource allocator circuit is configured to additionally receive the CBP value, and adjust the broadcast message rate and modulation data rate of the ITS message based on the CBP value.

4. The ITS station of claim 1 wherein the fair resource allocator circuit is configured to adjust a broadcast message rate of the ITS transmission to be greater than, or equal to, a minimum message rate that is required by a safety application and additionally adjust the modulation data rate of the ITS transmission in a cooperative manner in order to achieve a higher channel capacity.

5. The ITS station of claim 4, wherein a minimum required reliability ($R_{app}$) is estimated using:

$$R_{app} \geq \sum_{N}^{M_{min}} \binom{M_{min}}{N} p^N (1-p)^{M_{min}-N}$$

where: $M_{min}$ is a minimum message rate required to support the ITS application reliability requirement.

6. The ITS station of claim 4 wherein the fair resource allocator circuit adjusts the modulation data rate of the ITS message by selecting a minimum possible modulation data rate that enables a maximum awareness range.

7. The ITS station of claim 2 wherein the packet count and vehicle count estimator estimates a packet reception ratio (p) and a number of vehicles using the received messages from other vehicles, and the CBP value using a time window and at least one awareness range setting.

8. The ITS station of claim 1, wherein the number of vehicles $V_d$ is used to select a modulation data rate to use in the ITS transmission using:

$$\frac{(V_{d\,max} \times M_{min} \times T_D)}{\gamma} \leq \frac{(CBP_T)}{100},$$

where $M_{min}$ is a minimum message rate required to support an application reliability and $T_D$ represents a packet transmission time of different modulation data rates 'D'.

9. The ITS station of claim 8, wherein the formula is modified to identify legacy vehicles using an expression $V_{d1} \times M_{min1} \times T_{D1}$ and vehicles supporting an adjustment of a broadcast message rate and a modulation data rate of an ITS transmission in a cooperative manner based on application reliability requirements using an expression $V_{d0} \times M_{min0} \times T_{D0}$.

10. The ITS station of claim 1 further comprising a memory coupled to the fair resource allocator circuit and packet count and vehicle count estimator and configured to store and have extracted historical vehicle density and environmental information, vehicle count ($V_d$) estimation.

11. The ITS station of claim 1 wherein the ITS supports a plurality of different modulation data rates and the fair resource allocator circuit switches the ITS broadcast transmission between two of the plurality of different modulation data rates based on at least in part the indication of a number of the plurality of vehicles and a number of packets received from the plurality of neighbouring vehicles.

12. A host processor for an intelligent transportation system, ITS, for a vehicle, the host processor comprises:
    a packet count and vehicle count estimator arranged to receive broadcast ITS transmissions from a plurality of neighbouring vehicles and provide an indication of a number of the plurality of vehicles and a number of packets received from the plurality of neighbouring vehicles;
    a fair resource allocator circuit operably coupled to the packet count and vehicle count estimator and configured to adjust a broadcast message rate and a modulation data rate of an ITS transmission in a cooperative manner based on application reliability requirements, the number of the plurality of vehicles and the indication of the number of received packets; and
    a transmitter operably coupled to the fair resource allocator circuit and configured to broadcast at least one ITS message using the adjusted broadcast message rate and adjusted modulation data rate;

wherein a number of vehicles $V_d$ is estimated using $$V_d = \frac{P_C}{R_{min}}$$

where $P_C$ represents the total number of packets sensed by a vehicle over a first period, and $R_{min}$ represents a minimum transmission message rate used over a second period.

13. A method for operating an intelligent transportation system, ITS, for a vehicle, the method comprising:
    receiving broadcast ITS transmissions from a plurality of neighbouring vehicles; and
    providing an indication of a number of the plurality of vehicles and a number of packets received from the plurality of neighbouring vehicles;
    adjusting a broadcast message rate and a modulation data rate of an ITS transmission in a cooperative manner by a fair resource allocator circuit and based on application reliability requirements, the number of the plurality of vehicles and the indication of the number of received packets;
    broadcasting at least one ITS message using the adjusted broadcast message rate and adjusted modulation data rate;
    wherein a number of vehicles $V_d$ is estimated using $$V_d = \frac{P_C}{R_{min}}$$

where $P_C$ represents the total number of packets sensed by a vehicle over a first period, and $R_{min}$ represents a minimum transmission message rate used over a second period.

14. A vehicle comprising an integrated intelligent transportation system, ITS, station, that comprises a packet count and vehicle count estimator arranged to receive broadcast ITS transmissions from a plurality of neighbouring vehicles and provide an indication of a number of the plurality of vehicles and a number of packets received from the plurality of neighbouring vehicles; wherein the ITS station comprises:
    a fair resource allocator circuit operably coupled to the packet count and vehicle count estimator and configured to adjust a broadcast message rate and a modulation data rate of an ITS transmission in a cooperative manner based on application reliability requirements, the number of the plurality of vehicles and the indication of the number of received packets; and
    a transmitter operably coupled to the fair resource allocator circuit and configured to broadcast at least one ITS message using the adjusted broadcast message rate and adjusted modulation data rate;
    wherein a number of vehicles $V_d$ is estimated using $$V_d = \frac{P_C}{R_{min}}$$

where $P_C$ represents the total number of packets sensed by a vehicle over a first period, and $R_{min}$ represents a minimum transmission message rate used over a second period.

15. The method of claim 13, further comprising sensing when a communication channel is being used to receive ITS information and providing an indication of a time that the channel is in use to produce a channel busy percentage, CBP, value.

16. The method of claim 15, further comprising receiving the CBP value, and adjusting the broadcast message rate and modulation data rate of the ITS message based on the CBP value.

17. The method of claim 13, further comprising adjusting a broadcast message rate of the ITS transmission to be greater than, or equal to, a minimum message rate that is required by a safety application and adjusting the modulation data rate of the ITS transmission in a cooperative manner in order to achieve a higher channel capacity.

18. The method of claim 13, further comprising storing in a memory of the ITS extracted historical vehicle density and environmental information, and vehicle count estimation.

19. The method of claim 13, further comprising switching the ITS broadcast transmission between two of a plurality of different modulation data rates based on at least in part the indication of a number of the plurality of vehicles and a number of packets received from the plurality of neighbouring vehicles.

20. An intelligent transportation system, ITS, station for a vehicle, the ITS comprising:
    a packet count and vehicle count estimator arranged to receive broadcast ITS transmissions from a plurality of neighbouring vehicles and provide an indication of a number of the plurality of vehicles and a number of packets received from the plurality of neighbouring vehicles;
    a fair resource allocator circuit operably coupled to the packet count and vehicle count estimator and configured to adjust a broadcast message rate and a modulation data rate of an ITS transmission in a cooperative manner based on application reliability requirements, the number of the plurality of vehicles and the indication of the number of received packets; and
    a transmitter operably coupled to the fair resource allocator circuit and configured to broadcast at least one ITS message using the adjusted broadcast message rate and adjusted modulation data rate;
    wherein a minimum required reliability ($R_{app}$) is estimated using:

$$R_{app} \geq \sum_{N}^{M_{min}} \binom{M_{min}}{N} p^N (1-p)^{M_{min}-N}$$

where: $M_{min}$ is a minimum message rate required to support the ITS application reliability requirement.

* * * * *